Feb. 21, 1939.  J. M. MUELLER  2,147,987
NATURAL CORK PRODUCT AND PROCESS OF PREPARING SAME
Filed July 31, 1935  4 Sheets-Sheet 2

Inventor
Juan Martin Mueller
By Cushman, Darby & Cushman
Attorneys

Feb. 21, 1939. J. M. MUELLER 2,147,987
NATURAL CORK PRODUCT AND PROCESS OF PREPARING SAME
Filed July 31, 1935 4 Sheets-Sheet 3

Inventor
Juan Martin Mueller

Feb. 21, 1939.  J. M. MUELLER  2,147,987
NATURAL CORK PRODUCT AND PROCESS OF PREPARING SAME
Filed July 31, 1935  4 Sheets-Sheet 4

Inventor
Juan Martin Mueller

Patented Feb. 21, 1939

2,147,987

UNITED STATES PATENT OFFICE 2,147,987

NATURAL CORK PRODUCT AND PROCESS OF PREPARING SAME

Juan Martin Mueller, Palafrugell, Spain, assignor to Crown Cork & Seal Company, Inc., Baltimore, Md., a corporation of New York Application July 31, 1935, Serial No. 34,115

14 Claims. (Cl. 91—68)

The present invention relates to the improvement of natural cork and other sealing material. Particularly the invention relates to sealing means for container closures, such as caps of the crown type, wherein the cap assembly consists of a metal shell and a relatively thin cushion liner disc of natural cork.

Of the large number of sealing materials with which the invention is identified, natural cork is probably the most widely used and most satisfactory. However, it presents the difficulty that the supply is limited, being a natural product, and also notwithstanding the most careful methods of harvesting, and cutting and forming, only a small amount of the harvest is available as a first grade sealing material. This is due to the numerous pores, holes, cells or pits present in the cork and which appear in the surfaces of the cork bodies, such as sheets, liner discs, bottle stoppers, and gaskets. A pitted surface gives a poor appearance and is, moreover, objectionable first, because it initiates leakage, and second, because it promotes disintegration under pressure and flexing and other conditions to which the cork is subjected, accelerating leakage and resulting in cork particles becoming suspended in substances being sealed, e. g., foods, beverages, and medicines.

Due to the restricted supply of cork, and to the very small amount of cork harvest which is available as a first grade sealing material, the problem of improving the pitted surface characteristic of the very substantial portion of the cork harvest has been given serious consideration. However, previous efforts have only been satisfactory to a very limited extent and have never become commercially practical. This has been due to the difficulty of sealing and closing the pits without destroying the resilience and flexibility of the cork or objectionably changing its appearance, and also to the inability to retain permanently solid particles used in the filler composition such as comminuted cork, cemented within the pits. Obviously such cork particles must not separate and fall out when the cork body is compressed and flexed, or subjected to other conditions in practical use.

Therefore it is an important object of the present invention to render useful the very substantial portion of the natural cork harvest which of necessity must be rejected as not being first grade for sealing purposes due to the presence of objectionable pores, holes and other indentations, and to accomplish this result in a simple and economical manner.

I have discovered that the pitted surfaces in natural cork bodies, for example, sheets, liner discs, stoppers and gaskets, can be effectively sealed by subjecting the pits and their exposed wall surfaces to a sizing or coating operation with an adhesive composition, and thereafter introducing a filler composition consisting of a binder or adhesive and solid particles, such as cork dust, cork flour, or finely comminuted cork or mixtures thereof. Preferably, the walls of the pits and the surfaces of the cork dust are each provided with a substantially continuous film in tacky adhesive condition. Thus, the adhesive coated cork dust is caused to enter the adhesive coated pits and be adhered to the cork body. The binders or adhesives are dried, cured, or otherwise set to a final non-tacky and resistant state.

In this manner, a very permanent union of the cork dust with the walls of the pits is secured and the cork body has imparted to it a substantially continuous surface. The cork properties, namely resilience and flexibility and moisture resistance, are not interfered with but, in fact, are enhanced and the cork appearance is greatly improved. Of particular importance also, the cork body may be subjected to compression and flexing and other normal conditions without causing loosening or separation of the filler composition so that for all practical purposes the cork bodies are of high quality for sealing purposes.

It is an important feature of the invention that the sizing and filler composition may be selected from a wide range of materials now available commercially. The sizing and filler should (1) be inert with respect to the cork, (2) be capable of combining therewith and with each other, (3) be resistant to the action of the various temperature and solvent conditions surrounding the particular use of the cork, (4) be such as not to impair the cork properties, and (5) form a sufficiently flexible and/or resilient sealing material and bonding means as to not break down under compression or flexing of the cork.

There is produced an article (1) consisting of the cork body having its pits which are too small to receive filler composition, permanently filled with the sizing, and the surfaces of the larger pits provided with a relatively thin, substantially impervious film of sizing material in tacky adhesive state or non-tacky, non-adhesive state; and (2) a cork body having the pits thereof provided with a permanently united filling of the sizing and filler composition which does not disintegrate under the distortion strains to which the cork is subjected and which is unaffected by conditions to which the cork body is presented. In this connection, the cork bodies may be sized and the sizing film set, i. e., rendered non-tacky, so that the bodies may be stored or shipped. When the filling operation is to be completed at a later time or at a remote point from that at which the sizing operation is conducted, the sizing film will then be rendered adhesive or tacky by heat, solvent action or chemical reaction.

The sizing is preferably a binder, and is adsorbed into and/or adheres to the cork, forming about the pit walls a substantially continuous impervious film or base coating. The filler composition includes a binder which preferably is in the form of a thin adhesive film, coating the cork dust, cork flour or other finely divided cork particles. Both binders are characterized by an adhesive affinity for cork and for each other, and on setting form a flexible and resilient bond between the cork particles and the walls of the pits. Thus the cork qualities are not interfered with and when the cork body is distorted as by compression or flexing, the union is not cracked or loosened, so that the filling material remains permanently joined to the cork body.

The invention may be carried out by various processes, and obviously the apparatus employed will take any efficient form. However, the invention embodies a process and apparatus which I find to be highly efficient as regards recovery of satisfactorily treated cork bodies, and also enables the operations to be consummated in a relatively short time period.

I have referred herein to the improvement of natural cork, but it is to be understood that the invention is applicable to all types of cellular materials which have a pitted surface. Natural cork is mentioned primarily because it has the widest application as a sealing material among a large class with which the invention can be used and because the improvement of natural cork as explained represents a distinct problem.

Referring to the drawings.

The Sizing

The sizing is preferably a binder and will be selected from a wide range of suitable adhesives now commercially available.

Generally, although not necessarily, I use the sizing in the form of a liquid adhesive, but a sizing material capable of becoming spreadable by the action of heat, solvents, or chemical reaction, may be used as well as one which is normally plastic or thermo-plastic. The sizing should be one which will unite with the walls of the pits in the cork body by adsorption or adhesively or both (preferably adhesively) and form a tacky or adhesive or non-tacky, but thermo-plastic, continuous and impervious base film or coating thereon. It also must be capable of adhesively combining with the filler composition to form a substantially integral bond.

The sizing should be inert with respect to the cork and resistant to conditions of pressure, temperature, solvent action and chemical reaction, to all of which the cork body may be subjected in actual use.

The sizing, moreover, should be one which on setting does not impair the resilience or flexibility of the cork or its cork appearance. Preferably the sizing will enhance the cork properties by forming a flexible and resilient bond.

It is also desirable that the sizing be one which may be set so that the cork bodies may thereafter be stored or transported and the operation of filling with a suitable filler composition carried on at a later period or at another point from the sizing operation. That is, the sizing film will be (1) capable of being rendered non-tacky, and thereafter at the time of applying the filler composition, (2) be rendered tacky by heat (e. g., thermo-plastic), solvent action, or chemical action, whereupon the sizing film and filler composition will be given a final curing or setting and in this last state, are resistant to the conditions surrounding the use of the cork body.

In the procedure to be described, the sizing is a liquid adhesive and forms an adherent film upon the pit surfaces of the cork body which is permitted to remain in tacky condition for union with the filler composition. Stated another way, the pit surfaces are wetted with the sizing and in this condition the pits receive the filler composition.

The Filler Composition

The filler composition preferably includes a binder and solid particles, of which cork dust, cork flour, and finely divided cork particles of suitable size are preferred. The term cork "dust" as used in this specification is intended to include not only cork particles of a size generally called dust but as well cork particles of size generally called "flour", cork particles of any size appropriate for use, and also mixtures of one or more of such cork fines. Both the binder and the solid constituent may be selected from a wide range of suitable materials which are commercially available. The composition may take any form ranging from a thin liquid suspension to a pasty consistency, but preferably consists of cork dust having the surfaces of the particles coated or wetted with a thin, continuous, tacky or adhesive film of the binder. The binder will be the same as the sizing or one possessing similar characteristics to the sizing or binder as previously described, in that it is inert with respect to the cork body or to the substances with which the cork comes in contact, as well as resistant to all of the conditions surrounding the use of the cork body. Also, the binder of the filler composition is capable of adsorption and/or adhesive union with the cork body and of adhesive combination with the base or size film previously applied.

The filler composition, while preferably consisting of adhesively coated cork dust particles may be flowable, i. e., the binder will act as a liquid or pasty carrier for the cork dust.

As with the sizing film, the cork dust may be coated, the binder rendered non-tacky and the binder coated cork stored and shipped. When required for filling, the binder is rendered tacky by heat, e. g., thermoplastic, solvent action or chemical reaction.

The important characteristics of both the sizing film and the filler composition are that they possess a uniting and/or adhesive affinity for cork and each other, and are capable of permanent combination with each other and cork.

The binder of the filler composition is preferably similar to the sizing, but of course may be different. It is preferred, as stated, to apply the filler composition in tacky or wetted condition to the sizing film on the pit surfaces in a similar adhesive state, but, in some cases, either one or both of the sizing film, or the binder on the cork dust, will be partially set, i. e., rendered non-tacky, and will be rendered tacky in the presence of each other by heat, pressure, or by solvent or chemical action, induced through a separate means and/or by the action of one binder on the other.

Both the sizing and the filler composition, upon final setting, curing or vulcanizing as the case may be, are resistant to all of the temperature conditions, e. g., processing with sterilizing as well as refrigerating temperatures, compression and flexing, and solvent action, to which the cork body is normally subjected. In this connection, of course, both the sizing and the filler composition will be selected to be resistant and inert in association with a particular set of conditions to be encountered in the practical use of the cork article for sealing purposes.

THE PROCESS

The process of sizing and filling the natural cork bodies may be practiced in various ways and likewise the apparatus employed will take other forms than those illustrated. However, the process and apparatus to be described have been found efficient, enabling the cork to be treated rapidly and economically with very satisfactory results in that a sealing material of very high quality is produced.

Figures 1, 2, 3, 4, 5:
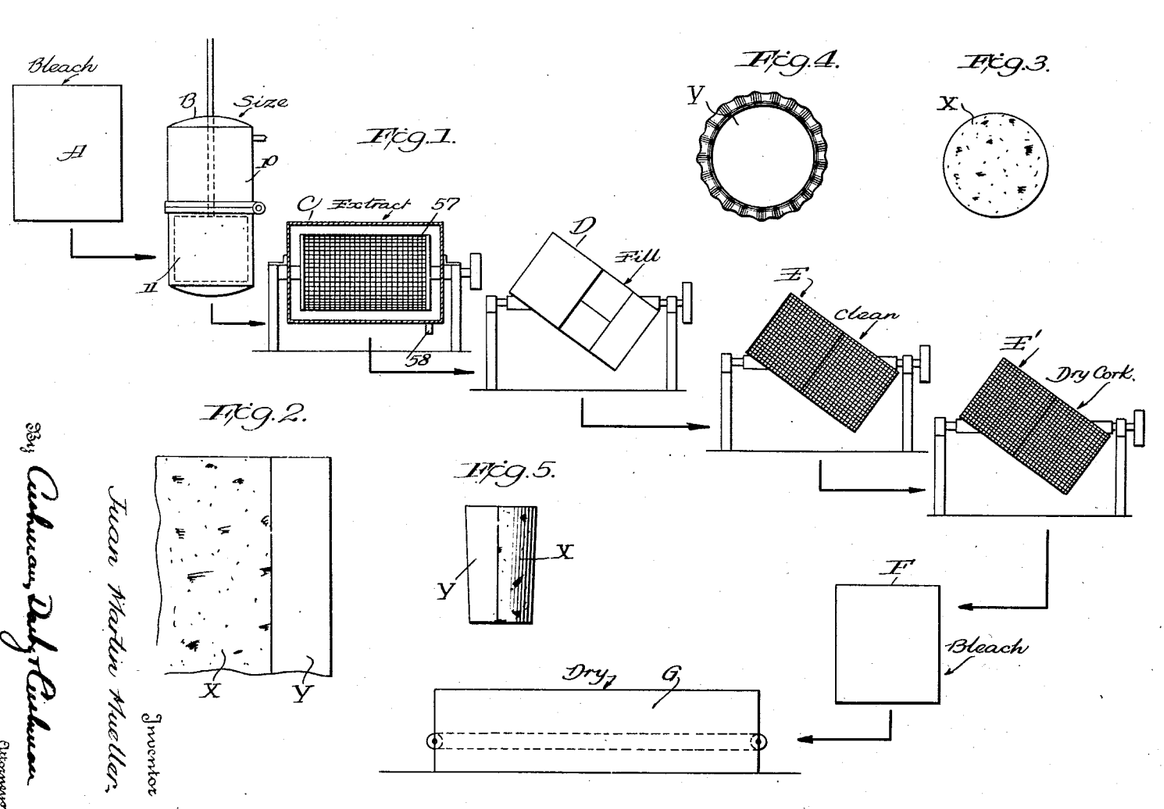
Figure 1 is a diagrammatic view illustrating one process in accordance with the invention.
Figure 2 is a top elevation of a cork sheet and for convenience, the pitted natural cork area is indicated at X and the same area after being treated in accordance with the present invention at Y.
Figure 3 is a similar view of a natural cushion liner disc before treatment.
Figure 4 is a bottom elevation of a cap having the cork disc of Figure 3 treated in accordance with the present invention positioned therein.
Figure 5 is an elevational view of the conventional type of bottle stopper similarly illustrated as in Figure 2 to show the appearance of the natural cork at X and the appearance improved by this invention at Y.

The process will be described for illustrative purposes in connection with the improvement of natural cork cushion liner discs for caps as shown in Figures 3 and 4, although any other material or articles of various sizes and shapes will be similarly treated.

Briefly, and referring to Figure 1, the discs, where desirable, are given the usual treatment of washing, bleaching with chloride of lime, treated with an acid such as oxalic acid, again washed and dried to a predetermined moisture content in the apparatus indicated at A. As stated, this is a customary treatment for natural cork discs.

Thereafter the discs are placed in the chamber indicated at B and subjected to the sizing step which preferably consists in dipping the discs into a bath of the sizing, but the sizing may be otherwise applied as by spreading or spraying upon the discs.

The bath should be of a consistency or thinness such that the discs will not adhere to each other in the bath, since such a condition would prevent proper wetting over the entire surface of each disc and penetration of the sizing adhesive into the pits and adherence to the walls thereof. Also, the bath should be of a thinness such that the excess sizing will drain from the discs, and/or may be removed by subjecting the discs to a centrifugal treatment. Moreover, the bath should be of such character that the discs when removed therefrom will not objectionably stick to one another. Stated another way, the viscosity and density of the bath are controlled so that the discs when removed therefrom and the excess sizing drained and/or the discs dried, the discs will have their surfaces including the surfaces of the pit walls coated with a thin continuous adhesive film and the smaller pits will be filled with the adhesive sizing.

It is preferred, but in some cases omitted, to subject the discs to a vacuum treatment just before they are dipped into the sizing solution, which will cause better penetration and anchorage for the size and insure thorough binding of the filler composition. The reduced pressure is maintained initially for a very brief period while the discs are submerged in the sizing bath. While still submerged, the vacuum is broken and a positive pressure is impressed upon the bath and the discs therein, also for a very short period, assuring similar anchorage and penetration of the size, whereupon the discs are removed from the bath.

The discs are permitted to drain in the chamber and excess sizing may also be positively extracted therefrom in the chamber.

It is preferred to remove the wetted discs following the draining step to a rotary extractor C where the discs are subjected to centrifugal force for throwing off any excess sizing. The sizing extracted in this manner is returned to the bath and reused. The draining and extraction steps in some cases are sufficient to leave the discs with a thin, continuous and impervious tacky film therefrom, but if desired the discs may be further dried to condition their tackiness or wetness or to render the adhesive non-tacky. Where the discs are dried to have the adhesive in a non-tacky state, it is, of course, understood that the tacky condition may be resumed if required at the time of completion of the filling operation, as heretofore explained.

The filling operation takes place in the cylinder D and preferably alternate layers of discs in tacky or dampened condition and the filler composition with the binder also tacky are supplied to the cylinder and the cylinder rotated to bring about intimate contact of the discs and filler. The filler composition is preferably in a condition wherein the cork dust is coated or wetted with a thin, continuous film of the binder in tacky condition. On the other hand, the cork dust may be suspended in a liquid binder or the filler composition may be of pasty consistency or the adhesive may be in non-tacky state on the dust. Rotation of the cylinder will throw the binder coated cork dust against the disc surfaces and into the pits. By reason of the adhesive coating on the cork dust, and the adhesive coating on the walls of the pits, the cork dust will adhere thereto and likewise subsequent additions or accretions of the binder coated cork dust which enter the pits will build up by adherence upon that which has already adhered to the pit walls or to other cork dust. This result is obtained through the intimate mixing of the filler composition and the discs, and by reason of the tacky condition of the sizing film and the film on the surfaces of the cork dust, the adhesives having an affinity for each other as well as for the cork. In this manner, the filler composition is caused to seal and fill the pits of the cork discs and a thorough and permanent bonding of the cork composition to the surfaces of the pits takes place. The union is flexible and resilient and the cork dust filling is likewise possessed of these properties.

The discs are then transferred to a foraminous cylinder E which is rotated to remove excess filling composition after which dry comminuted cork may be added to the cylinder E or the discs removed to another and substantially similar cylinder E' to which such dry comminuted cork is added. The discs are agitated in contact with the cork particles by rotating the cylinder and in this manner any excess filler composition which may be clinging to the surfaces of the discs is removed and likewise drying or absorbing of any excess adhesive takes place; also there is accomplished a polishing of the discs to produce a smooth continuous surface. The cork particles are of a size to accomplish these results.

Thereafter the discs are given a treatment in the apparatus F similar to the initial washing-bleaching-acid treatment in apparatus A, or they are first passed through an oven or curing chamber G to set, vulcanize and/or dry the binders, and then subjected to the washing-bleaching-acid treatment described.

The drying, vulcanizing or setting operation for the binder takes place under conditions and temperatures such that the cork properties, i. e., resilience and flexibility are preserved. Also this curing and drying operation is carried on under conditions and temperatures such that the adhesive is brought to its final non-tacky state of strong adhesiveness, flexibility and resilience, and in this condition, will be permanent and resistant to high and low temperatures, compression and flexing, and any of the other arduous or extreme conditions to which sealing material is normally subjected.

The discs are now ready for use or may be stored for a considerable period and shipped without fear of deterioration.

I have referred to cork dust as the most desirable material for the filler composition, but, of course, other solid particle materials may be used. The cork dust, however, has the advantage that it is resilient, and does not change the cork appearance. Of equal importance, the binders employed, of necessity, have a combining affinity or an adhesive affinity for cork and hence this characteristic is available in connection with the cork dust. Greater selection is, therefore, afforded for the binders employed and a secure bonding of the cork particles to the cork body is obtained.

APPARATUS

Sizing

Referring to Figures 6 to 12 inclusive, the sizing chamber B comprises a casing having the upper and lower members 10, 11 hinged together at 12. The sizing bath is disposed in the lower member which is fixed in position as, for example, disposed in the floor as shown. Arranged within the upper member and reciprocably supported so as to be capable of submergence in the bath, is a foraminous basket 13. This basket or box is carried on the rod 14, which, as shown at 15 and 16, is connected to the top and bottom of the box and extends through the integral guide 17 of the upper member 10. A suitable packing gland 18 is disposed about the rod 14 and extends within the guide 17 to engage a packing material 18 Supported on the gland 18 is a split collar 19 for a purpose which will presently be described. The rod 14 at its upper end is coupled to a rod 20 having rack teeth 21 thereon and the coupling is of the separable type indicated as a whole in Figures 11 and 12 at 22. This coupling comprises a member pivoted to the rod 20 as shown at 23 and has an arm 24 provided with a hook 25 engaging over a pin 26 on the rod 14. The coupling also has an arm 27 to which is attached a suitable operating means, for example, a rope or chain 28, whereby the member 22 is moved about its pivot 23 to uncouple the rods 14 and 20.

Figures 6, 7, 8:
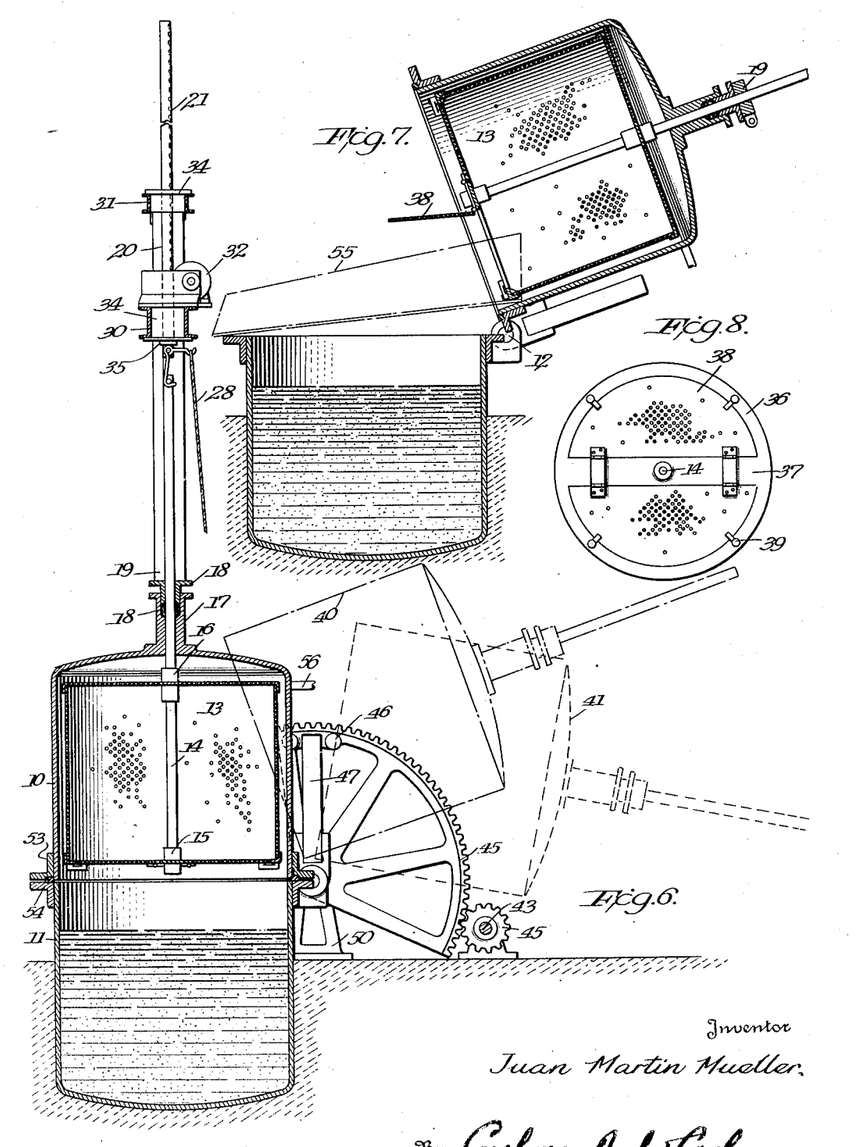
Figure 6 is a view partly in section showing one form of apparatus for sizing the cork bodies.
Figure 7 is a sectional view showing the apparatus of Figure 6 with the parts in open position.
Figure 8 is a bottom elevation of the container in which the cork bodies are treated in the apparatus of Figures 6 and 7.

The apparatus comprises the standards 29 supporting cross frames 30 and 31. Supported on the cross frame 30 is a suitable motor 32 having a shaft 33 carrying a gear (not shown) which engages the rack teeth 21. The rod 20 is guided in its movement by suitable bushings 34 in the cross frames and has a stop collar 35 to limit the upward movement of the rod.

The bottom of the basket comprises a door frame 36 in the form of a ring having an integral or otherwise connected cross member 37 upon which is hinged a pair of foraminous doors 38 which are locked in position by swivel pins 39 pivoted upon the ring or door frame.

The upper member 10 is adapted to be swung to the positions shown in dotted lines at 40 and 41 in Figure 6.

Figure 9:
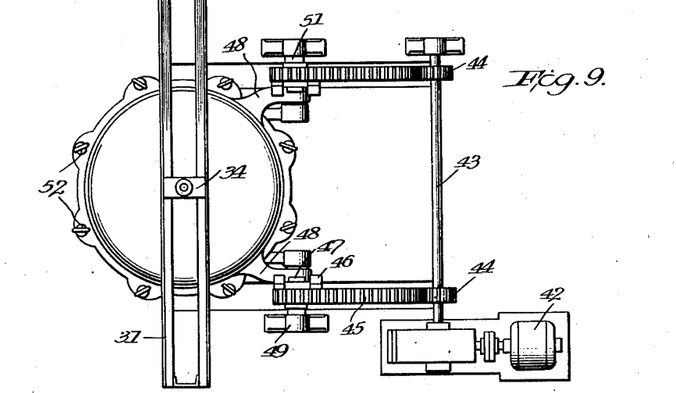
Figure 9 is a top elevation of the apparatus of Figures 6 and 7.
Figure 10:
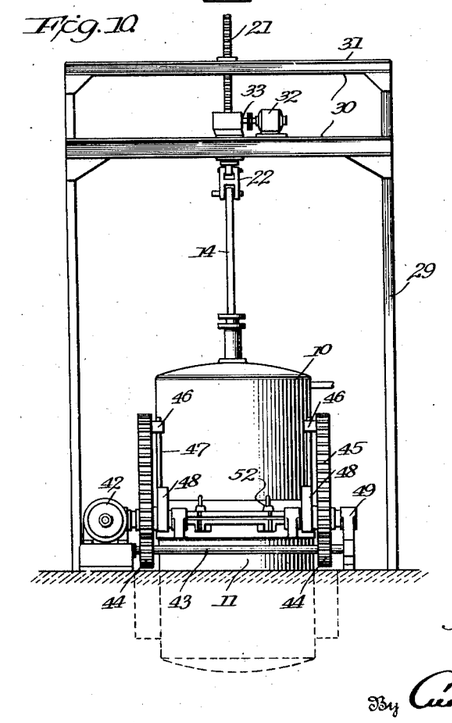
Figure 10 is a side elevation of the apparatus of Figures 6 and 7.
Figures 11, 12:
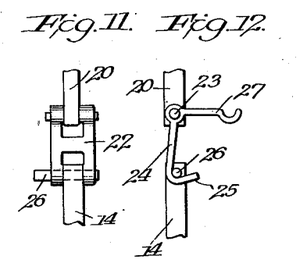
Figures 11 and 12 are detailed elevational views of a shaft coupling means associated with the apparatus of Figures 6 and 7.

The means provided for swinging the upper member 10 and the box 13 upon the pivot or hinge 12 comprises, as shown in Figures 9 and 10, a suitable motor or other prime mover 42 which drives the shaft 43 having gears 44 engaging the gear segments 45. The segments 45 are provided with inwardly extending lugs 46 which engage a pair of upstanding operating members 47 carried by the ears 48 and which are integrally or otherwise connected at the base of upper member 10. A pair of trunnions 49 is supported upon standards 50 on opposite sides of the apparatus, in which are carried shafts 51 extending through openings in the said ears and forming a bearing therefor, so as to support the upper member 10 in its swinging movement away from and toward the member 11. It is to be observed that the lugs 47 on the segments 45 are spaced apart a distance with respect to the width of the operating members 47 so that any lost motion, as where the motor overruns slightly, will not result in straining or breakage of the parts.

The top and bottom members 10—11 are sealed or connected together by any suitable type of fastening means 52 mounted upon suitable flanged rings 53 respectively connected at the abutting edge portions of the members 10 and 11 and the lower ring 53 carries a suitable gasket of ring shape 54.

With the parts in the position shown in Figure 6, when it is desired to swing the member 10 and the basket 13 to either of the dotted line positions 40 or 41, the collar 19 is clamped about the rod 14 and the coupling between the rods 14 and 20 is disconnected. Thereupon, the locking means 52 is disconnected and the motor 42 is operated whereby each operating member 47 is engaged by one of the lugs 46 to carry the upper member 10 and the box or basket 13 to the desired position. In Figure 7, the lower door 38 is shown open and a detachable trough 55 employed to remove the discs from the basket. On the other hand, when the upper member 10 and the basket 13 are in the position shown at 41 in Figure 6, a similar trough will be used to supply untreated discs to the basket. Having delivered a supply of discs to the foraminous basket 13, the door 38 is closed and locked and the motor 42 operated, whereby one of the lugs 46 will engage each arm 47 to return the upper member 10 to the position shown in Figure 6. The locking means 52 will now be connected so that the chambers are tightly joined and sealed by the gasket 54. The rods 14 and 20 are then connected by the coupling 22 and collar 19 is released from the shaft 14. In the preferred procedure, the chamber A is evacuated by means of a pump (not shown) connected to a conduit 56. For example, a reduced pressure of substantially 40 centimeters or greater is used but in some cases a lower pressure is employed. Thereafter, while the reduced pressure is maintained, the motor 32 is operated to lower the rods 20 and 14 and the basket 13, whereby the basket containing the cork bodies or discs will be submerged in the bath. The reduced pressure is maintained for a very brief period while the basket and cork bodies are submerged say about one minute and thereafter the vacuum is broken, and a positive pressure is impressed upon the chamber A through the pipe 56. This pressure is maintained also for a very brief period, about one minute, whereupon the motor 32 is then actuated to raise the basket to the position shown in Figure 6. The discs are permitted to drain and, if desired, the rod 20 or the rod 14 or both are given a rotary movement in order to centrifugally extract any excess sizing which may remain upon the cork bodies or discs.

The collar 19 is now fixed to the shaft 14, as previously described, and the coupling between the rods is disconnected, whereupon the upper member 10 is swung to the position shown in Figure 7 and the wetted discs removed therefrom by means of the trough 55.

As described, the discs are preferably carried to an extraction chamber comprising a box or cylinder C within which is mounted a foraminous cylinder 57. The excess sizing which is centrifugally thrown off by rotation of the cylinder 57 collects in the bottom of the box or cylinder C and is returned to the bath by means of the outlet 58.

Figure 13:
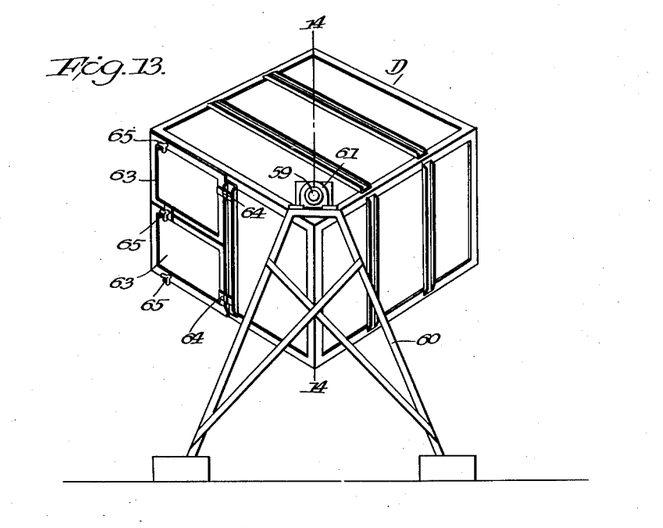
Figure 13 is a perspective view of one of the chambers employed for treating the cork bodies following the sizing treatment.
Figure 14:
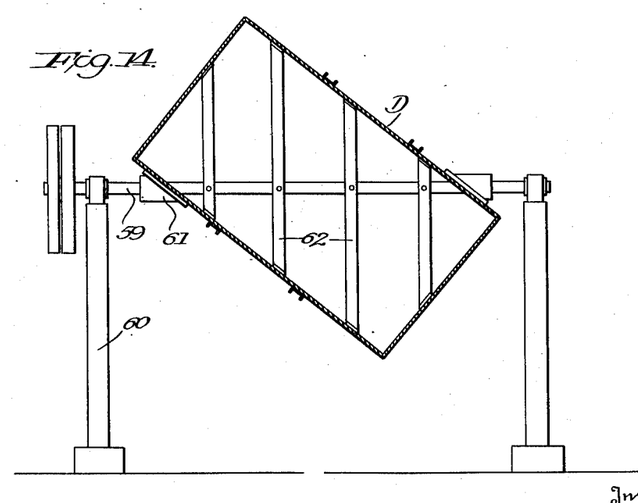
Figure 14 is a sectional view of the line 14—14 of Figure 13.

From the extraction chamber C, the discs are carried to the filling chamber D, which is shown in detail in Figures 13 and 14.

In this connection, the discs may have a binder composition set to a non-tacky state either while in the container 13, within the chamber A, or in the extraction chamber C.

Preferably, the discs are provided over their entire surfaces, including the wall surfaces of the pits, with a thin adhesive or wetted film of the sizing binder. The discs do not stick together objectionably and may be readily handled without injury.

*Filling*

The treated discs from the chamber C, with the sizing film in tacky condition or in a condition to be susceptible of cementation with the filler composition, are supplied to the filling chamber D which is shown in detail in Figures 13 and 14. This chamber is mounted for rotation on a shaft 59 carried by standards 60 and is connected to the shaft by means of brackets 61. The box or chamber D is angularly disposed with relation to the shaft and is provided with a multiplicity of cross pieces 62 which are connected to the shaft 59 and the box and extend across the latter, as shown, forming fixed paddles or agitating means. These paddles or agitating means 62 may take other forms and in fact may be omitted in some cases. The disc and adhesive filler are introduced into the box which is closed upon all sides, through the upper door 63 which is suitably hinged at 64 and provided with a locking means 65. The lower door 63 is of similar construction.

Preferably, the treated discs are introduced to the chamber D in alternate layers, i. e., after the introduction of one layer, and before the introduction of a succeeding layer, the binder-cork dust or filler composition is applied. This procedure is desirable in that it assures intimate contact of the filler composition with the discs and shortens the time of operation. After a suitable batch of alternate layers of discs and filler composition have been disposed in the chamber D, the door 63 is closed and the chamber is rotated for a short time or until the filler composition has been satisfactorily introduced into the discs and the pores, holes and indentations therein are filled. It has been possible to treat five hundred thousand discs more or less in this manner and complete the filling operation in about fifteen minutes.

In this filling chamber, the filler composition is caused to completely circulate in contact with the discs by reason of the rotary motion imparted to the chamber through the shaft 59 as well as the agitating and baffle action created by the presence of the cross bars 62.

The angular disposition of the chamber D with reference to the horizontal shaft 59 enables the upper door 63 to be opened with that end of the box extending upwardly for supplying discs and filler to the box, and upon the completion of the filling operation, the lower door 63 is opened with that end of the box extending in a downward direction, whereby the treated discs may be readily removed.

This filling operation results in the filler composition adhesively uniting with the base film or sizing and with the walls of the pits, whereby the pits are filled and sealed with the filler composition. Of course, a certain amount of the filler material will adhere to the cork bodies and this may be removed by continuously rotating the chamber D for a longer period, or by transferring the treated discs from the chamber D to a cleaning, polishing and drying chamber.

The filled discs from the chamber D are carried to a cleaning chamber E of similar construction to the chamber D or a cylinder, but having the walls thereof foraminous, whereby rotation of the chamber will throw off any excess filler composition. This will be collected and reused as far as possible. After the excess filler composition has been removed, a quantity of dry comminuted cork or cork dust is preferably added to the chamber E for the purpose of absorbing any sizing or filler composition which may remain as well as for removing by bombardment or tumbling, any cork dust particles or clumps which may have collected objectionably upon the surfaces of the discs. In this manner, excess sizing or filler composition is removed, the discs are thus partially dried and they are polished so that they have a smooth continuous surface. Instead of accomplishing this tumbling and bombarding operation with comminuted cork in the chamber E, I may transfer the discs from the cleaning chamber E to a similar chamber E' to which the dry comminuted cork may be added, and the cleaning and polishing operation completed in this chamber. It will be understood, of course, that the chamber E' need not be employed.

From the chamber E or E', the discs are given a treatment in the chamber F, similar to the washing-bleaching-acid treatment described in connection with apparatus A, or the discs are carried to an oven or curing or vulcanizing chamber G, following which they are subjected to the washing-bleaching-acid treatment. The oven is preferably of the conveyor type and the temperature of the oven and speed of travel of the conveyor are controlled to produce final setting, curing or vulcanizing, as the case may be, of the binders, whence they assume a stable and permanent resistant state. This heating treatment in the oven G should be carried out so that the cork properties are not affected and also in order that the binder reaches its optimum adhesive non-tacky condition. The chamber G will in some cases, e. g., with certain types of synthetic resin binders, constitute the means for applying both heat and pressure to cure the same. In other words, the chamber G will be a heating means, a pressure exerting means or both, or apply a curing or setting vapor or gas, all dependent, in one case on the binder or binders employed.

The discs are now ready for use and it is found that they are characterized by a smooth continuous surface free of objectionable pits, and a quality for sealing purposes substantially equal to that of the best grade of natural cork. Moreover, the filling material does not separate out under compression and flexing of the cork and actually enhances these cork properties.

In Figure 2, I have shown at Y, by way of illustration, a sheet of flat gasket treated in accordance with this invention; in Figure 4 a crown cap having a disc Y treated by this invention assembled with the cap shell in the usual manner; and in Figure 5, there is illustrated at Y a cylinder or usual bottle stopper which has been improved by the present invention. The letter X indicated natural cork having an irregular and pitted surface before treatment as described herein.

Typical binder

By way of example only, the process and apparatus herein described are operable, using among the larger variety and types of binders suitable and available for the purpose, an adhesive solution or binder for the sizing and filler of rubber-like character. Such a binder has been found satisfactory where the cork is employed as a sealing means for foods, medicines and pressure and non-pressure beverages.

The term "rubber" is intended to include solutions of rubber, rubber latex, gutta-percha and/or balata, synthetic latex, synthetic rubbers such as "Duprene" and "Thiokol" and in fact, any analogous or equivalent compounds.

The solvents employed are those in general use, namely carbon tetrachloride, carbon disulphide, ether, chloroform, ethylene tri-chloride, benzene, acetone and many others.

Vulcanizing agents, such as sulphur and accelerators and activators of the usual types, are also employed.

In the case of rubber solutions, a rubber content of between 2 and 5% will give a satisfactory bath. Similarly latex solutions of a consistency of 35 to 38% rubber are useful.

Preferably, a thin latex solution of about 10 to 12% rubber content with about 5% carbon tetrachloride is used, the latter improving the adhesion of the latex.

"Revertex" which is a concentrated latex also is preferred.

Means to retard coagulation of the latex, such as casein, gelatin or "Stabilex" are employed in some cases. A preservative for the casein such as parachlormetacresol or "Preventol" is also used if desired. Ammonia or other alkali solvent for casein can also be added.

The vulcanizing means such as sulphur, zinc oxide and a suitable accelerator are used in precise amounts to assure complete vulcanization.

A strong rubber solvent such as carbon tetrachloride, chloroform, acetone or ethylene-trichloride added to a thinned rubber latex causes the particles of latex to swell up slightly without forming lumps, notwithstanding the presence of a substantial amount of water. This enhances adhesion of the latex to the cork and aids in binding the adhesive coated cork dust to the adhesive wetted discs.

A satisfactory sizing bath consists of the following:

1 kg. of casein in 10 litres of water and 150 cc. of 22° ammonia.
300 g. of zinc oxide.
200 g. of sulphur.
20 g. accelerator (L. A. T. 2).
2 g. parachlormetacresol ⎱ dissolved in 10 cc. of water.
3 g. caustic soda ⎰
10 kg. "Revertex".
30 litres water.
50 cc. carbon tetrachloride.

For the filler composition 100 cc. of carbon tetrachloride are used in the above solution and sufficient cork powder or dust is added and mixed and wetted with the adhesive solution until the surfaces of the cork powder are provided with a thin adhesive film. If desired, or necessary, some drying may be resorted to. The filler composition may be described as consisting of the cork powder having the particles coated with a thin tacky film and relatively dry as distinguished from an agglomerated or viscous mass. That is, the filler is capable of being worked into the pits and adhered thereto by rotating or otherwise agitating the cork discs and filler in contact with each other as described. As with the sizing film, the coating on the particles may be rendered nontacky and tackiness resumed when the filler is used.

If desired, the filler composition may consist of a suspension of the cork particles in a liquid body of the adhesive solution. Again, the filler composition may be of paste-like form.

Both the sizing and the filler composition exhibit marked properties of adhesive affinity for the cork and for each other and upon final curing, the bonding of the cork dust to the surfaces of the pits in the discs is characterized by resilience and flexibility and the union is substantially integral and stable, permanent and resistant for the many uses to which the discs are applied.

There has been described one type of sizing and filler composition utilizing a rubber-like binder for illustrative purposes only. Other types of binders may be selected, such as natural and synthetic resins and glutinous adhesives, some of which are heat coaguable and many others now commercially obtainable, such as adhesive lacquers. Thus, binders which are vulcanized by heat, or heat and pressure, or are cured and set by heat, pressure or both, or heat coagulable adhesives are used. Also, the binders for the sizing and filler may respectively be the same, or the same but of different concentration, or of entirely different types, e. g., resinous and rubber-like, resinous and glutinous, glutinous and rubber-like, etc. The rubber-like binder is typical of the other binders which may be used and their action in forming a sizing film and cork dust filler composition.

While I have described the filling operation as taking place in a rotating box or cylinder to which the discs and filler are added in alternate layers, this filling operation can be carried out by spraying the filler upon the discs while they are being agitated or revolved in the box or cylinder; also, the filler may be simply spread on the discs or sprayed on them while the discs are at rest and, in fact, any suitable method or means will be used to fill the preconditioned adherent pits.

The important feature of the invention is the initial sizing and wetting of the cork discs or cork bodies with a binder to provide the pits therein with a substantially continuous and impervious film of adhesive, i. e., render them adherent and conditioned to receive a filler composition, preferably including solid particles and a binder.

In this manner, the pits in the cork bodies are permanently filled and sealed, and the cork body is improved and rendered useful as a high grade sealing material.

As will be appreciated, various materials having a pitted surface rendering them objectionable for sealing purposes may be treated in accordance with this invention and likewise the sizing and filling means may be varied or selected at will. Likewise, the invention is useful for treating sheets, blocks, gaskets, liner discs and stoppers of cork composition, i. e., comminuted cork united by a binder. Hence, the invention is capable of considerable modification and such changes are considered to be included within the scope of the appended claims.

This application is a continuation in part of my copending allowed application Serial No. 735,900, filed July 18, 1934 and allowed April 28, 1937.

I claim:

1. The process of treating cork having pits therein, comprising forming an adhesive coating on the surfaces of the pits and thereafter filling the pits with binder coated solid particles.

2. The process of treating cork having pits therein, comprising forming an adhesive coating on the surfaces of the pits and thereafter filling the pits wih cork particles and a binder.

3. The process of treating cork having pits therein comprising subjecting the cork to reduced pressure and immersing the cork in a bath of adhesive while maintaining such reduced pressure, impressing a positive pressure on the bath and cork therein, removing the cork from the bath and forming an adhesive coating on the surfaces of the pits to render them adherent to a filler, and filling the adhesive coated pits with solid particles and a binder.

4. The process of treating cork having pits therein, comprising forming an adhesive coating on the surfaces of the pits and thereafter filling the pits with solid particles and an adhesive while agitating the cork therewith.

5. The process of treating cork having pits therein, comprising forming an adhesive coating on the surfaces of the pits and thereafter filling the pits with solid particles and an adhesive while agitating the cork therewith, and thereafter agitating the cork with dry comminuted cork.

6. A cork body having the pores and cracks therein filled with a mixture of rubber and cork.

7. A cork body having the pores and cracks therein filled with a mixture of a composition comprising rubber latex and cork.

8. A cork body having the pores and cracks therein filled with a mixture comprising a rubber solution and cork dust.

9. A cork body having the pores and cracks therein filled with a mixture of a composition comprising rubber latex and cork and an ingredient enabling the composition to be vulcanized.

10. A cork body having the pores and cracks therein filled with a mixture of a composition comprising rubber latex and cork and an ingredient enabling the composition to be plasticized.

11. The process of filling the pores and cracks of cork bodies comprising treating a cork body with a flowing mixture of rubber and comminuted cork, and drying the cork body in the presence of comminuted cork.

12. A cork body having the pores and cracks therein filled with a mixture of vulcanized rubber and cork.

13. A cork body having the pores and pits thereof coated with a sizing film of an adhesive material selected from a group consisting of rubber, natural and synthetic resins, glutinous adhesives, and adhesive lacquers, said pores and pits being filled with cork particles having a binder coating thereon consisting of one of the materials selected from the above group, the sizing film being of a different material from the coating upon the cork particles.

14. The process of treating cork having pits therein comprising forming an adhesive coating on the surfaces of the pits from a material selected from a group consisting of rubber, natural and synthetic resins, glutinous adhesives, and lacquers, and thereafter filling the pits with cork particles coated with a binder selected from the above group, the binder being of a different material from said coating.

JUAN MARTIN MUELLER.